(12) United States Patent
Nakama

(10) Patent No.: US 12,467,909 B2
(45) Date of Patent: Nov. 11, 2025

(54) GAS CHROMATOGRAPH

(71) Applicant: SHIMADZU CORPORATION, Kyoto (JP)

(72) Inventor: Yuji Nakama, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 236 days.

(21) Appl. No.: 18/121,124

(22) Filed: Mar. 14, 2023

(65) Prior Publication Data

US 2023/0366859 A1 Nov. 16, 2023

(30) Foreign Application Priority Data

May 11, 2022 (JP) .................................. 2022-078420

(51) Int. Cl.
*G01N 30/50* (2006.01)
*G01N 30/12* (2006.01)
*G01N 30/30* (2006.01)
*G01N 30/02* (2006.01)

(52) U.S. Cl.
CPC ............. *G01N 30/50* (2013.01); *G01N 30/12* (2013.01); *G01N 30/30* (2013.01); *G01N 2030/025* (2013.01); *G01N 2030/3084* (2013.01)

(58) Field of Classification Search
None
See application file for complete search history.

(56) References Cited

U.S. PATENT DOCUMENTS

| | | | | |
|---|---|---|---|---|
| 3,762,878 A | * | 10/1973 | Villalobos | G01N 30/68 436/154 |
| 6,063,166 A | * | 5/2000 | Wilson | G01N 30/28 96/108 |
| 7,384,453 B2 | * | 6/2008 | Bostrom | H01M 8/0681 95/82 |
| 2009/0223369 A1 | * | 9/2009 | Uegaki | F27D 21/0028 96/102 |
| 2010/0101304 A1 | * | 4/2010 | McIntyre | G01N 30/84 73/23.37 |
| 2013/0219992 A1 | * | 8/2013 | Okada | G01N 30/02 73/23.41 |
| 2020/0088697 A1 | * | 3/2020 | Nakama | G01N 30/66 |

FOREIGN PATENT DOCUMENTS

| | | | | |
|---|---|---|---|---|
| CN | 113056671 A | * | 6/2021 | ............. G01N 30/30 |
| JP | S6342467 A | * | 2/1988 | |
| JP | H07-43356 A | | 2/1995 | |
| JP | 2012229918 A | * | 11/2012 | |
| JP | 2020-118616 A | | 8/2020 | |

OTHER PUBLICATIONS

1st Office Action issued for corresponding CN Application No. 202310317969.0, dated Aug. 26, 2025, along with a English-language machine translation of the same.

* cited by examiner

*Primary Examiner* — Daniel S Larkin

(74) *Attorney, Agent, or Firm* — Muir Patent Law, PLLC

(57) ABSTRACT

A gas chromatograph includes a sample introduction unit configured to introduce a vaporized sample into a separation column together with a carrier gas, a detection unit configured to detect a gas emitted from the separation column, and a catalyst processing unit. The catalyst processing unit includes a catalyst configured to introduce a gas containing the carrier gas discharged from the sample introduction unit or the detection unit to oxidize the hydrogen gas.

9 Claims, 4 Drawing Sheets

GAS CHROMATOGRAPH

CROSS-REFERENCE TO RELATED APPLICATIONS

This application claims priority under 35 U.S.C. § 119 to Japanese Patent Application No. 2022-078420 filed on May 11, 2022, the entire disclosure of which is incorporated herein by reference in its entirety.

FIELD OF THE INVENTION

The present invention relates to a gas chromatograph, particularly a gas chromatograph using hydrogen as a carrier gas.

DESCRIPTION OF THE RELATED ART

The following description sets forth the inventor's knowledge of related art and problems therein and should not be construed as an admission of knowledge in the prior art.

A gas chromatograph introduces a vaporized sample into a column together with a carrier gas and detects the sample separated by the column with a detector. As the carrier gas for separating the sample, an inert gas is generally used, and helium, argon, nitrogen, hydrogen, and the like are mainly used.

In the sample introduction unit for introducing the sample into the column, as described in Patent Document 1, unnecessary carrier gases and the sample are discharged to the outside of the gas chromatograph to control the quantity of the sample to be introduced into the column.

Further, in a detector for detecting the gas discharged from the column, as shown in Patent Document 2, the sample gas containing the sample is generally discharged to the outside after passing through the detector.

In a case where hydrogen is used as a carrier gas, the used carrier gas is discharged to the outside of the gas chromatograph, and the discharged hydrogen is accumulated in a test room, which may cause an explosion. For this reason, a countermeasure has been taken in which a tube or piping is attached to the gas outlet to discharge hydrogen to the outdoor or a draft chamber or the like.

However, a gas chromatograph needs to be installed considering tubes and piping, and the installation location of the gas chromatograph is limited, and the space occupied by the tubes and piping limits the installation and the working space of other devices. Further, in the case of discharging hydrogen by using an exhaust system, such as, e.g., a draft chamber, pressure fluctuations originating from the exhaust system are transmitted to the gas chromatograph through tubes and piping, which deteriorates the analytical performance due to vibrational noises.

PRIOR ART DOCUMENT

Patent Document

Patent Document 1: Japanese Unexamined Patent Application Publication No. 2020-118616
Patent Document 2: Japanese Unexamined Patent Application Publication No. H7-43356

SUMMARY OF THE INVENTION

Problems to be Solved by the Invention

The present invention has been made to solve the above-described problems, and an object of the present invention is to provide a gas chromatograph that has no risk of explosion even when hydrogen is used for a carrier gas and eliminates the need for tubes and piping for exhausting the carrier gas.

Means for Solving the Problem

One aspect of the gas chromatograph according to the present invention that has been made to solve the above-described problem is as follows.
A gas chromatograph comprising:
  a sample introduction unit configured to introduce a vaporized sample into a separation column together with a carrier gas;
  a detection unit configured to detect a gas emitted from the separation column; and
  a catalyst processing unit,
  wherein the catalyst processing unit is configured to introduce a gas containing the carrier gas discharged from the sample introduction unit or the detection unit, the catalyst processing unit including a catalyst for oxidizing the hydrogen gas.

Effects of the Invention

According to the above-described aspect of the gas chromatograph according to the present invention, a gas containing a carrier gas discharged from the sample introduction unit or the detection unit is introduced into the catalyst processing unit provided with the catalyst for oxidizing the hydrogen gas, and therefore, the hydrogen gas is oxidized and converted into water. As a result, since the hydrogen is not discharged from the gas chromatograph, facilities, such as, e.g., tubes and piping, are not required, the limitation of the installation location of the gas chromatograph and the degradation of the analytical performance caused by vibrational noise can be suppressed.

BRIEF DESCRIPTION OF THE DRAWINGS

The preferred embodiments of the present invention are shown by way of example, and not limitation, in the accompanying figures.

EMBODIMENTS FOR CARRYING OUT THE INVENTION

In the following paragraphs, some preferred embodiments of the invention will be described by way of example and not limitation. It should be understood based on this disclosure that various other modifications can be made by those skilled in the art based on these illustrated embodiments.

A gas chromatograph of the present invention will be described in detail using FIG. 1 to FIG. 4.

The characteristics of the present invention are as follows. The gas chromatograph GC includes a sample introduction unit configured to introduce a vaporized sample into a separation column together with a carrier gas, a detection unit configured to detect a gas emitted from the separation column, and a catalyst processing unit. The catalyst processing unit is configured to introduce a gas containing the carrier gas discharged from the sample introduction unit or the detection unit, the catalyst processing unit including a catalyst for oxidizing the hydrogen gas.

The sample introduction unit is provided with a sample vaporization chamber 2 and is responsible for vaporizing the sample, mixing a carrier gas introduced into the vaporization chamber with the vaporized sample, and introducing them into the column 4. An inlet (injector) 1 for introducing the sample and a carrier gas introduction portion (not shown) are connected to the vaporization chamber 2.

Various configurations of the sample vaporization chamber, such as those shown in Patent Document 1, can be adopted. Normally, the inlet is held at a high temperature (150 to 250° C., maximum 450° C.) to instantaneously vaporize the injected sample. The vaporized sample is mixed with a carrier gas. In the case of highly concentrated components or a sample containing nonvolatile or highly persistent contaminants, rather than introducing all of the sample or the carrier gas into the column carrier gas, only a part of them is introduced to control the sample amount. The sample, the carrier gas, etc., not introduced into the column are discharged to the outside of the vaporization chamber 2.

Figure 1:
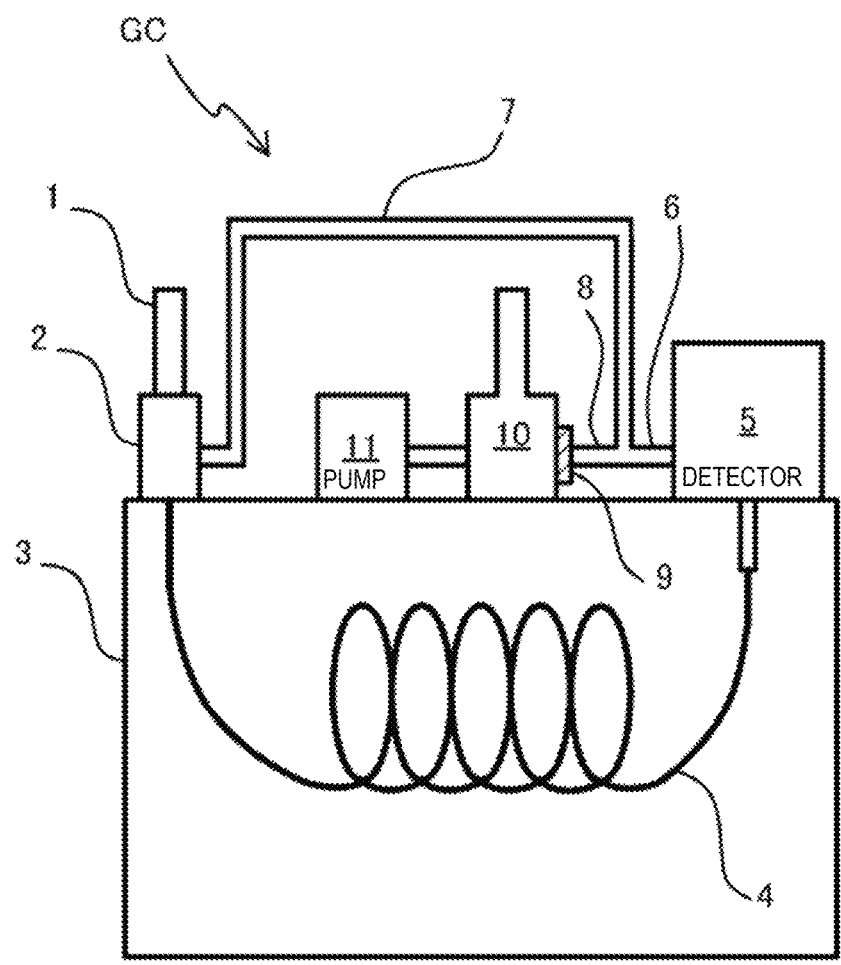
FIG. 1 is a schematic diagram describing a first embodiment according to a gas chromatograph of the present invention.

In the present invention, gases containing a carrier gas discharged from the vaporization chamber 2 are introduced into the catalyst processing unit 10 by the piping (flow path) 7. The gases from the vaporization chamber 2 may be introduced directly into the catalyst processing unit 10, as shown in FIG. 1, but may be introduced along with the discharge (piping 6) from the detector 5, which will be described later, into the catalyst processing unit 10 by the piping 8.

The sample or the like introduced from the vaporization chamber 2 which is a sample introduction unit to the column 4 is separated for each of the components contained in the sample when passing through the column 4, and reaches the detector 5 which is a detection unit. In order to stabilize or promote the separating performance, the column 4 is held in a temperature-controllable oven (also referred to as a "column oven") 3 and maintained in an isothermal or high-temperature state.

The gas emitted from the column 4 is identified and quantified for the sample components by the detector 5. As the detector 5, various detectors, such as, e.g., a thermally conductive detector shown in Patent Document 2, a flame ionization detector, and a dielectric barrier discharge ionization detector, are used. The thermally conductive detector detects the differences in the thermal conductivity of the compounds compared with a reference gas (e.g., a carrier gas). The sample and the carrier gas are heated by the filament elements and reach a high-temperature state. The gas containing the sample and the carrier gas is discharged from the detector 5 and introduced into the catalyst processing unit 10 via the piping 6 and 8.

In a case where the detector requires a reference gas, a reference gas supplying pipe (not shown) is connected to the detector 5.

The gas containing a carrier gas (hydrogen) discharged from the vaporization chamber 2 or the detector 5 is configured to pass through a filter 9 for removing water, an organic matter, and impurities in the gas, or to introduce a gas pretreated by another impurity removing method, prior to being introduced into the catalyst processing unit 10.

In the catalyst processing unit 10, the gas containing a carrier gas introduced from the piping 8 and air (oxygen-containing gas) introduced from the pump 11 are mixed and brought into contact with the catalyst for oxidizing hydrogen.

The catalyst is used by being attached to a surface of a structure having air permeability, such as, e.g., a mesh-like structure. As the catalyst material, any material may be used as long as it oxidizes hydrogen. Platinum (Pt) is typically used, but other materials may be used. The hydrogen is converted to water (water vapor) by oxidation by the catalyst and released to the outside (in the atmosphere) of the device.

The introduction of an air source (oxygen source) into the catalyst processing unit 10 may be performed not only by using the pump 11 but also by using a gas cylinder, a compressor, or the like. Alternatively, a gas supply source containing not air but oxygen, such as, e.g., pure oxygen, may be introduced into the catalyst processing unit 10. Further, a gas containing oxygen may be supplied to the catalyst processing unit 10 by, for example, diffusing a gas, without using a pump, a gas cylinder, a compressor, or the like.

In the catalyst processing unit 10, the catalyst may be used at room temperature, may be temperature-controlled by a heater or the like, or may be used after being cooled by a fan or the like. For example, in the case of using platinum for the catalyst, the catalyst activity can be enhanced by being used at several hundred degrees Celsius (° C.). Further, by placing the catalyst in such a high-temperature environment, it is possible to suppress the adsorption of impurities that deteriorate the catalyst, which also leads to a longer life of the catalyst.

Figure 2:
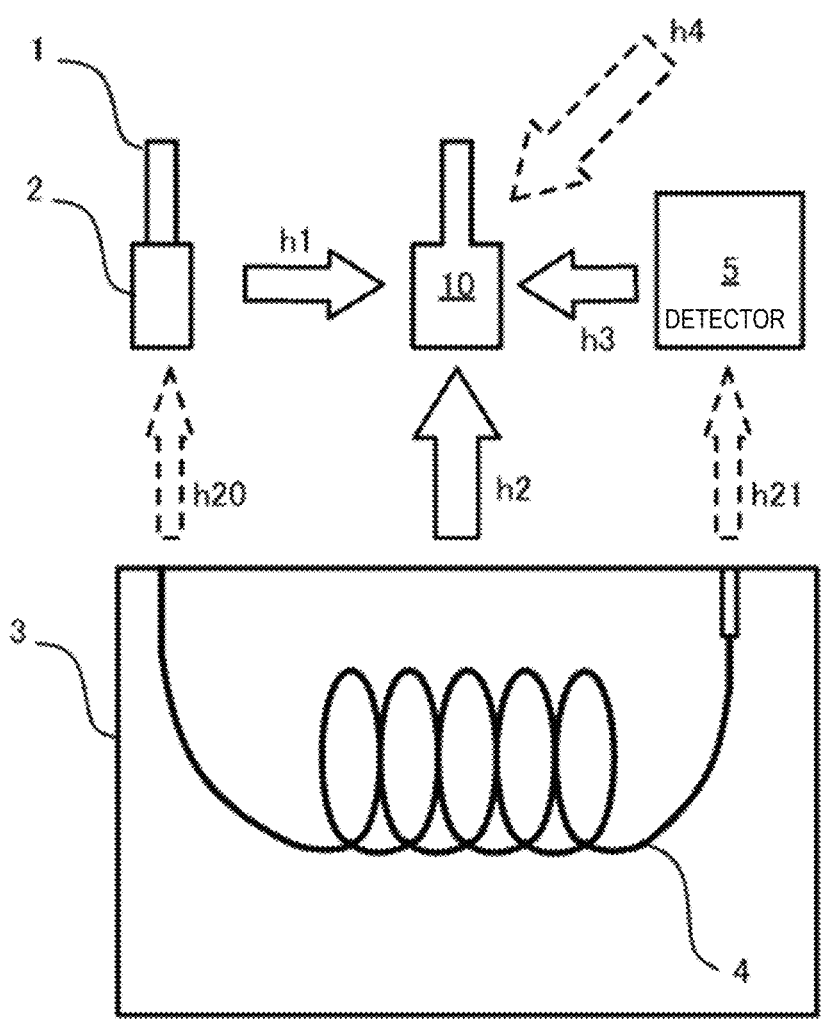
FIG. 2 is a schematic diagram for describing the transfer of the heat quantity according to the gas chromatograph of the present invention.

As the heat source for heating the catalyst in the catalyst processing unit, a heater dedicated to the catalyst processing unit can be used, but as shown in FIG. 2, a heat source used in a member (the vaporization chamber 2, the column oven 3, the detector 5) other than the catalyst processing unit can also be used. A part (h1 to h3) of the quantity of heat supplied by these heat sources is used to heat the catalyst processing unit 10. Further, a part (h4) of the heat quantity may be supplied from a member other than the gas chromatograph to the catalyst processing unit 10. Of course, an excess heat quantity (h20, h21) of the column oven 3 can also be used for the vaporization chamber 2 or the detector 5.

For example, it is possible to arrange the catalyst processing unit 10 so as to be adjacent to or in contact with the vaporization chamber 2, the oven 3, the detector 5, and like, or configure the holding member for holding the vaporization chamber 2 by the material high in thermal conductivity and arrange the catalyst processing unit 10 on the same holding member. Further, by providing the catalyst processing unit 10 on the top board of the body case of the gas chromatograph, it is possible to achieve safety and space-saving. Further, the top board is heated by the heat from the oven 3, and the power consumption for heating the catalyst processing unit is suppressed by transferring the heat to the catalyst processing unit. On the other hand, although it may be considered such that a catalyst processing unit is disposed in the oven, it is not preferable to install the catalyst processing unit in the oven because the inside of the oven is a closed space, which is dangerous due to an increase in hydrogen concentration when the hydrogen gas leaks.

Figure 3:
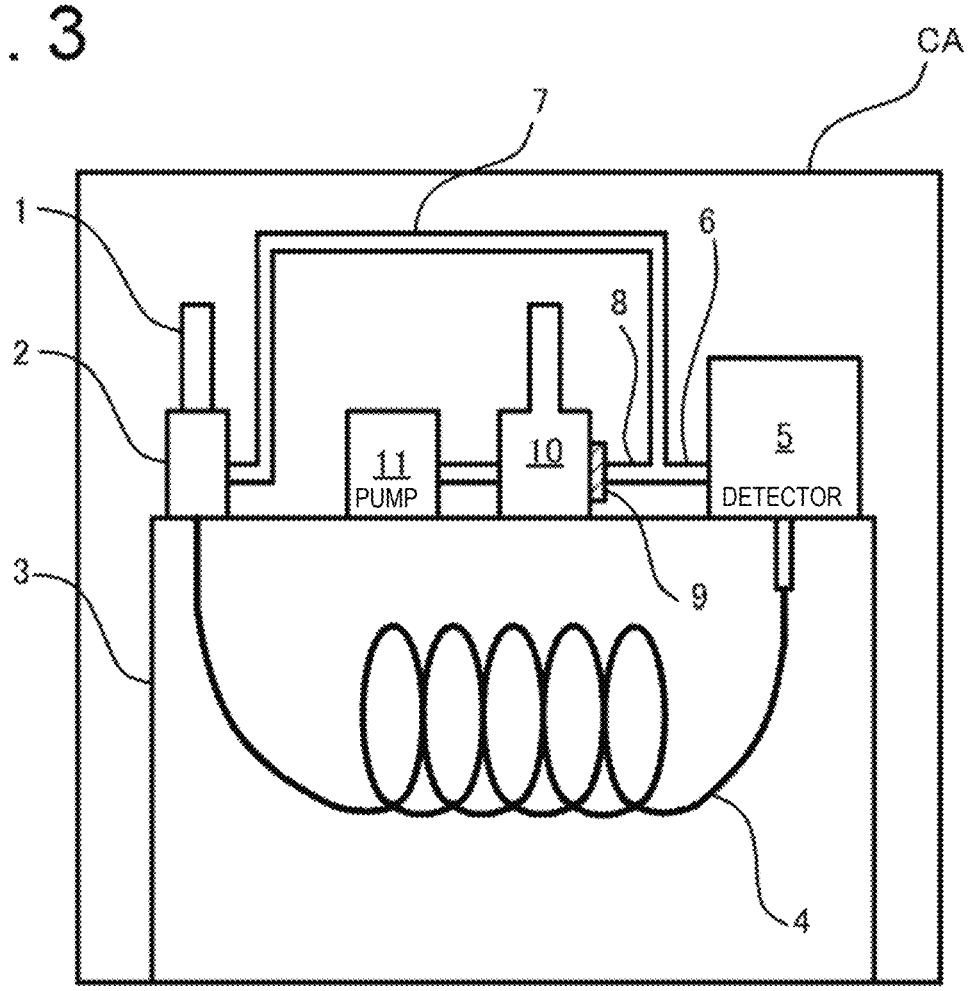
FIG. 3 is a schematic diagram describing a second example according to a gas chromatograph of the present invention.

In the gas chromatograph GC, the column oven 3, the vaporization chamber 2, the detector 5, and the like are not exposed and are covered with a housing CA as shown in FIG. 3. With this housing CA, it is possible to prevent the inside heat from being easily released to the outside, and to prevent the operator or the like from contacting the high-temperature column oven or the like from the outside.

The heat quantity emitted from the column oven can be efficiently provided to the catalyst processing unit 10 by disposing the catalyst processing unit 10 inside the housing surrounding the column oven 3. Moreover, the heat-transfer from the column oven 3 to the catalyst processing unit 10 can be more efficiently performed by disposing the catalyst processing unit 10 directly on the column oven 3.

As the members to be disposed on the top board of the column oven 3, not only the catalyst processing unit 10 but also other high-temperature members, such as, e.g., the vaporization chamber 2 and the detector 5, are disposed together, so that the heat-transfer efficiency between adjacent members can be enhanced. Moreover, by collecting the high-temperature members in one place, as compared with the case of disposing these members separately, it is also possible to significantly reduce the opportunity for the operator to contact each member, which increases safety. Further, since the vaporization chamber 2 and the detector 5 are connected to the catalyst processing unit 10 by piping, the piping can also be made compact by arranging the members close to each other, and the quantity of the carrier gas remaining in the piping can also be reduced.

Figure 4:
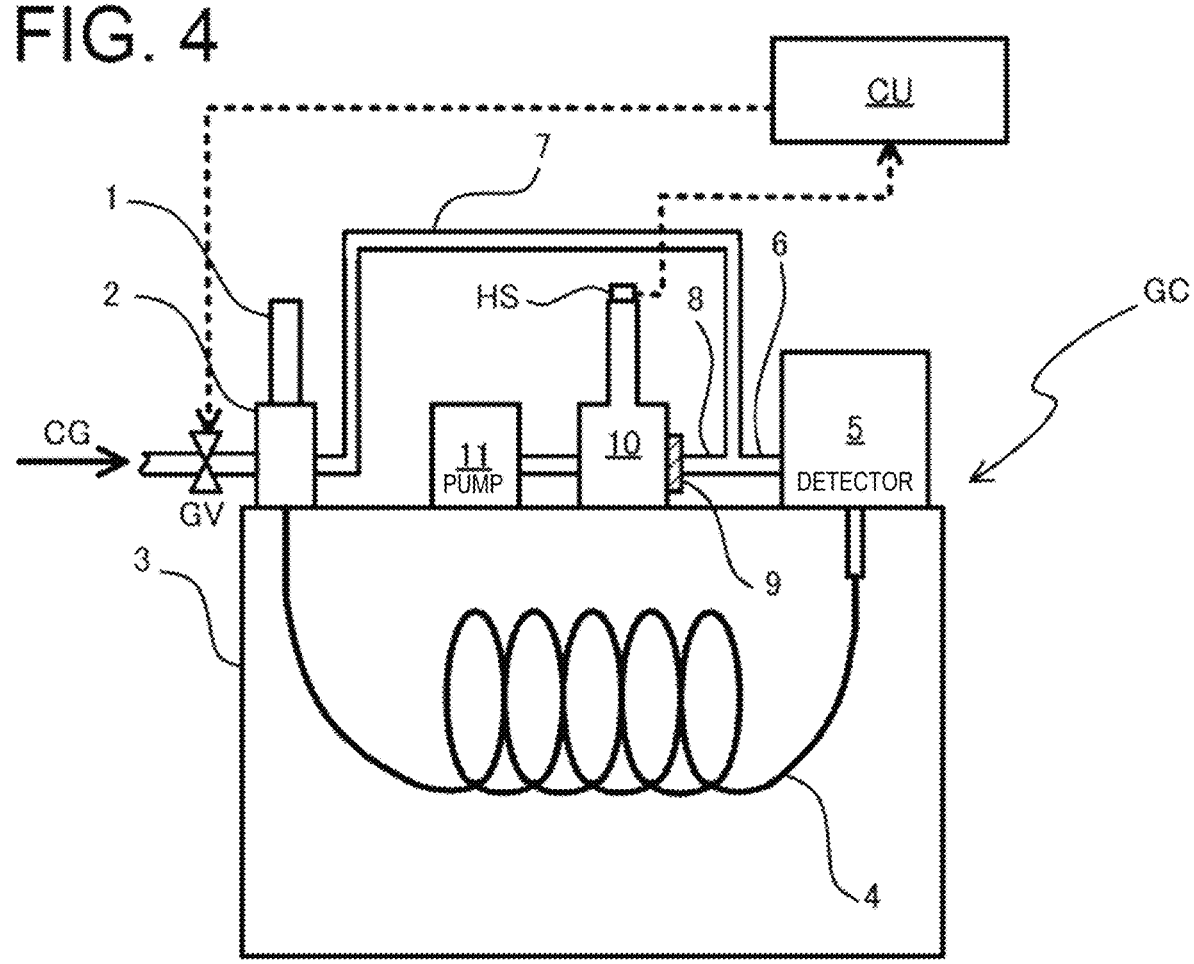
FIG. 4 is a schematic diagram describing a third example according to the gas chromatograph of the present invention.

As shown in FIG. 4, it may be configured such that a hydrogen detection sensor (HS) is provided to a part of the discharge flow path of the processing gas of the catalyst processing unit 10 to detect whether an untreated hydrogen gas remains in the gas processed by the catalyst processing unit 10 or the residual concentration. By utilizing the detection result, in a case where a hydrogen gas remains, in the controller CU, it is possible to operate the piping valve (GV) and shut down the carrier gas (hydrogen) supply CG.

The controller CU may be linked to the carrier gas supply of the gas chromatograph to build a system that constantly monitors the hydrogen concentration emitted from the catalyst processing unit 10 to enable carrier gas to be stopped immediately and to be safer when the hydrogen is not converted to water (water vapor) and is released into the atmosphere due to the decrease of the catalyst activity.

It is clear that the above-described description of the gas chromatograph is an illustration of embodiments and falls within the technical scope of the present invention even if it is changed, added, or modified as appropriately within the scope of the spirit of the present invention.

It will also be appreciated by those skilled in the art that the above-described exemplary embodiment is illustrative of the following aspects.

(Item 1)
A gas chromatograph comprising:
  a sample introduction unit configured to introduce a vaporized sample into a separation column together with a carrier gas;
  a detection unit configured to detect a gas emitted from the separation column; and
  a catalyst processing unit,
  wherein the catalyst processing unit is configured to introduce a gas containing the carrier gas discharged from the sample introduction unit or the detection unit, the catalyst processing unit including a catalyst for oxidizing the hydrogen gas.

The hydrogen gas is converted to water by the catalyst processing unit, which eliminates the need for tubes and the piping to discharge the hydrogen gas, the limitation of the location of the gas chromatograph, and the degradation of the analytical performance caused by vibrational noises.

(Item 2)
The gas chromatograph as recited in the above-described Item 1, wherein the carrier gas is hydrogen.

The chromatograph of the present invention can be used when hydrogen is used for the carrier gas. Further, it is possible to easily avoid a dangerous state, such as an explosion of hydrogen gas (Item 3)
The gas chromatograph as recited in the above-described Items 1 or 2, wherein a gas containing oxygen is supplied to the catalyst processing unit.

By making the exhaust gas containing hydrogen (carrier gas) and the gas containing oxygen with the catalyst, it is possible to efficiently convert it to water.

(Item 4)
The gas chromatograph as recited in any one of the above-described Items 1 to 3,
  wherein the catalyst processing unit includes a device for heating or cooling a catalyst.

By placing the catalyst in an optimal location, the activity of the catalyst can be maximized. Further, in the case of placing the catalyst in a high-temperature environment, it is possible to suppress the adsorption of contaminants that deteriorate the catalyst, which leads to a longer life of the catalyst.

(Item 5)
The gas chromatograph as recited in the above-described Item 4, further comprising:
  a heat source used as a member other than the catalyst processing unit,
  wherein a part of a heat quantity supplied by the heat source is used to heat the catalyst processing unit.

As a result, the power consumption for heating the catalyst of the catalyst processing unit can be suppressed.

(Item 6)
The gas chromatograph as recited in the above-described Item 5,
  wherein the heat source includes a column oven for heating the separation column, and
  wherein the catalyst processing unit is arranged in a housing surrounding the column oven.

The quantity of heat emitted by the column oven can be efficiently transferred to the catalyst processing unit by the housing surrounding the column oven. Further, it is possible to prevent the operator from contacting a high-temperature member, such as, e.g., a column oven and a catalyst processing unit.

(Item 7)
The gas chromatograph as recited in the above-described item 6,
  wherein heat sources other than the catalyst processing unit and the column oven are arranged on a top board of the column oven in one place.

By aggregating the heat source members, such as, e.g., the vaporization chamber and the detector, on the top board of the column oven, not only the heat-transfer efficiency between the members can be increased, but also the risk of the operator contacting the members can be avoided, which increases the safety, as compared with the case in which the members are present separately.

(Item 8)
The gas chromatograph as recited in any one of the above-described Items 1 to 7, further comprising:
  a filter,
  wherein the filter is configured to remove, before a gas containing the carrier gas introduced to the catalyst processing unit contacts the catalyst, at least a part of components other than the carrier gas from the gas.

By providing a filter in front of the catalyst processing unit, deterioration of the catalyst due to organic matter and impurities is prevented, which extends the life of the catalyst.

(Item 9)

The gas chromatograph as recited in any one of the above-described Items 1 to 8, further comprising:

a controller, wherein the controller includes a carrier gas detector for detecting the carrier gas from the gas discharged from the catalyst processing unit, and performs control to stop supplying the carrier gas to the gas chromatograph when the carrier gas detector detects the carrier gas.

Even if the activity of the catalyst decreases and hydrogen is discharged outside the chromatograph system, by constantly monitoring the hydrogen detection sensor by the controller, it is possible to realize a system capable of automatically stopping the carrier gas (hydrogen) in dangerous situations. This system provides a higher level of safety.

DESCRIPTION OF SYMBOLS

1: Sample inlet port (injector)
2: Sample vaporization chamber
3: Column oven
4: Separation column
5: Detector
6 to 8: Piping (flow path)
9: Filter
10: Catalyst processing unit
11: Pump
CU: Controller
HS: Hydrogen detection sensor
GV: Gas valve
CG: Carrier gas
CA: Housing

The invention claimed is:

1. A gas chromatograph comprising:
a sample introduction unit configured to introduce a vaporized sample into a separation column together with a carrier gas;
a detection unit configured to detect a gas emitted from the separation column; and
a catalyst processing unit,
wherein the catalyst processing unit is configured to introduce a gas containing the carrier gas discharged from the sample introduction unit or the detection unit, the catalyst processing unit including a catalyst configured to oxidize the carrier gas.

2. The gas chromatograph as recited in claim 1, wherein the carrier gas is hydrogen.

3. The gas chromatograph as recited in claim 1, wherein a gas containing oxygen is supplied to the catalyst processing unit.

4. The gas chromatograph as recited in claim 1, wherein the catalyst processing unit includes a device configured to heat or cool the catalyst.

5. The gas chromatograph as recited in claim 4, further comprising:
a heat source used as a member other than the catalyst processing unit,
wherein a part of a heat quantity supplied by the heat source is used to heat the catalyst processing unit.

6. The gas chromatograph as recited in claim 5, wherein the heat source includes a column oven configured to heat the separation column, and
wherein the catalyst processing unit is arranged in a housing surrounding the column oven.

7. The gas chromatograph as recited in claim 6, wherein heat sources other than the catalyst processing unit and the column oven are arranged on a top board of the column oven in one place.

8. The gas chromatograph as recited in claim 1, further comprising:
a filter,
wherein the filter is configured to remove, before a gas containing the carrier gas introduced to the catalyst processing unit contacts the catalyst, at least a part of components other than the carrier gas from the gas.

9. The gas chromatograph as recited in claim 1, further comprising:
a controller,
wherein the controller includes a carrier gas detector configured to detect the carrier gas from the gas discharged from the catalyst processing unit, and performs control to stop supplying the carrier gas to the gas chromatograph when the carrier gas detector detects the carrier gas.

* * * * *